United States Patent [19]

Olsen et al.

[11] Patent Number: 4,561,838

[45] Date of Patent: Dec. 31, 1985

[54] APPARATUS FOR MAKING A HOSE HAVING AN INDEX MARK

[75] Inventors: Roy W. Olsen; Curtis H. Bell, both of Lincoln, Nebr.

[73] Assignee: The Goodyear Tire & Rubber Company, Akron, Ohio

[21] Appl. No.: 696,290

[22] Filed: Jan. 30, 1985

Related U.S. Application Data

[62] Division of Ser. No. 543,583, Oct. 19, 1983, which is a division of Ser. No. 299,286, Sep. 4, 1981.

[51] Int. Cl.$^4$ .................. B29C 17/08; B29H 3/06
[52] U.S. Cl. ................. 425/387.1; 425/290; 425/403; 249/175
[58] Field of Search .............. 425/290, 387.1; 264/504, 154, 155, 506, 509

[56] References Cited

U.S. PATENT DOCUMENTS

| | | | |
|---|---|---|---|
| 2,643,417 | 6/1953 | Smith | 264/509 |
| 3,015,857 | 1/1962 | Weinandy | 264/506 |
| 3,021,571 | 2/1962 | Jackson et al. | 264/506 |
| 3,028,290 | 4/1962 | Roberts et al. | 264/506 |
| 4,070,429 | 1/1978 | Uhlig | 264/504 |
| 4,382,767 | 5/1983 | Naugle et al. | 425/387.1 X |

Primary Examiner—J. Howard Flint, Jr.
Attorney, Agent, or Firm—William A. Drucker; R. D. Thompson

[57] ABSTRACT

Mandrel-cured, curved elastomeric hose is provided with an indexing mark that is formed prior to or during curing of the hose on the mandrel. The rigid curved mandrel has an exterior hose-bearing surface and an interior cavity. The cavity and exterior surface are connected by a small passageway or hole which is located where the index mark is to be made on the hose. A sleeve having a wall of uncured elastomeric material is mounted on the mandrel such that a portion of the sleeve covers the passageway. The mandrel having the sleeve mounted thereon is placed in an autoclave and subjected to steam pressure. The steam pressure forces elastomer material into the passageway and thereafter cures the elastomer sleeve into a hose. The pressure inside the cavity is approximately atmospheric at the introduction of the steam pressure. The cavity within the mandrel may be sealed except for the passageway or the cavity and the passageway may be vented to atmospheric pressure.

2 Claims, 5 Drawing Figures

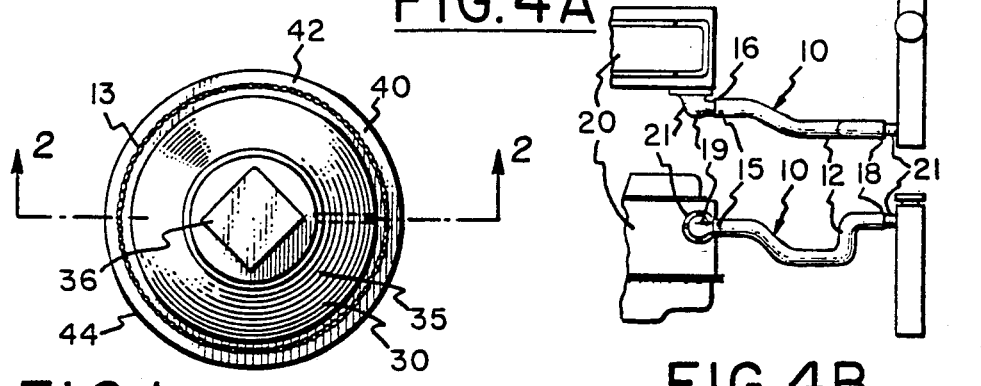
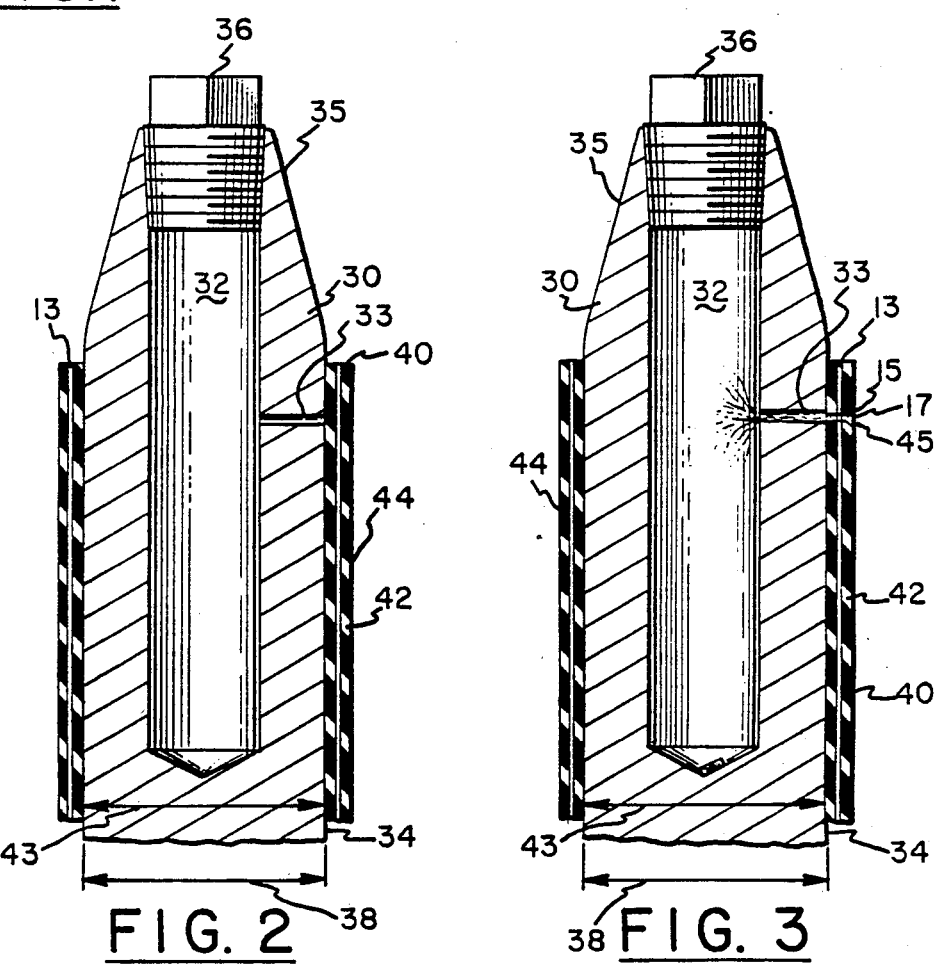

APPARATUS FOR MAKING A HOSE HAVING AN INDEX MARK

This is a division of Ser. No. 543,583 filed Oct. 19, 1983 which is a division of Ser. No. 299,286 filed Sept. 4, 1981.

The foregoing abstract is not to be taken as limiting the invention of this application and in order to understand the full nature and extent of the technical disclosure of this application reference must be made to the accompanying drawings and the following detailed description.

The invention relates to the manufacture of curved hose and particularly to curved hose having an indexing mark at or adjacent an end thereof that is provided to aid in installation of the hose. Axially elongated hose that is curved in more than one plane is commonly used in the cooling system of an automobile engine. To facilitate installation of such complexly curved radiator hose in the proper orientation there is a need of an accurately located indexing mark at or adjacent an end of the hose.

The description of the invention will be better understood by having reference to the annexed drawings in which like numerals are utilized to indicate like items.

FIG. 1 is an end view of a portion of a hose curing mandrel having a sleeve of uncured elastomer material mounted thereon;

FIG. 2 is a side view in section of a portion of a hose curing mandrel having mounted thereon a sleeve of uncured elastomeric material;

FIG. 3 is a view similar to FIG. 2 illustrating the effect of the application of a fluid pressure differential across the wall of the sleeve with higher pressure present on the exterior of the mandrel and sleeve;

FIG. 4A is a plan view in greatly reduced scale showing a radiator hose according to the invention attached at one end to an engine and at the opposite end to a radiator.

FIG. 4B is a side elevation of that which is shown in FIG. 4A.

The invention will be described with respect to mandrel-cured curved radiator hose such as may be employed to connect an automotive engine to a radiator. This description is not intended to limit the invention to such hose.

The hose 10 includes a wall 12 of elastomer material. Typically, there is embedded within the wall 12, which may consist of one or more layers of elastomer material, a reinforcement layer 13 of filamentary material which extends throughout the length and circumference of the hose. The hose wall 12 includes an indexing mark 15 at or adjacent an end 16 thereof. The mark 15 is formed during curing of hose 10 on a mandrel 30 so that the mark 15 is reliably and repeatably formed at the same location on each hose produced on that mandrel thus justifying reliance on the mark during installation of the hose in its intended application. In its preferred form the mark 15 takes the form of a hole or passageway 17 extending through the wall of the hose at a predetermined location on the hose 10 adjacent its end 16.

As shown in FIGS. 4A and 4B, the hose 10 is extended in its axial or lengthwise direction beyond that length revealed in the accompanying FIGS. 1 through 3 and is curved in one or more planes. Variation in the location of the mark 15 about the circumferential direction of the hose 10 will result in the opposite end 18 of the hose being incorrectly located relative to the radiator nipple 21 when the improperly placed mark 15 on the hose 10 is aligned with its complementary mark 19 on the corresponding nipple 21 on the automotive engine 20 to which the hose is intended to be installed.

A mandrel 30 such as that shown in FIGS. 1 through 3 is utilized in the manufacture of elastomeric hose 10 according to the invention. The mandrel 30 is axially elongated. The overall configuration of the mandrel 30 is curved in one or more planes. The configuration of the mandrel 30 corresponds to that of the hose 10 to be cured thereon. The mandrel 30 includes an interior cavity 32 and an exterior hose-bearing surface 34. A small hole or passageway 33 places the exterior hose-bearing surface 34 of the mandrel 30 in communication with the interior cavity 32. The cavity 32 in a preferred embodiment is otherwise sealed and, therefore, the pressure within can change by fluid flow through the passageway 33. The mandrel 30 may be formed of cast aluminum. The end of the mandrel opposite that shown in FIGS. 1–3 is typically attached to a rack (not shown) along with other mandrels of similar or different configurations. The outer end 35 of the mandrel 30, which is shown in FIGS. 1 through 3, is bored and tapped, and has a plug 36 inserted to form the sealed cavity 32 within the mandrel.

Hose 10 according to the invention is manufactured as follows:

A sleeve 40 having a wall 42 of uncured elastomer material is mounted on the mandrel 30. This is accomplished by sliding the sleeve axially over the hose-bearing exterior surface 34 of the mandrel 30. The tapered outer end 35 of the mandrel 30 facilitates mounting of the sleeve 40. The sleeve 40 is of sufficient length or axial extent to substantially fill the mandrel 30 and to cover the hole 33 in the mandrel. The inside diameter 43 of the sleeve 40 corresponds approximately to the outside diameter 38 of the mandrel 30, both of which as shown are generally of circular cross-sectional configuration. For example, for a one and three-fourths inch inside diameter radiator hose, the inside diameter of the sleeve is typically from one thirty-second of an inch smaller than to one sixty-fourth of an inch greater than the outside diameter of the curing mandrel. After the sleeve 40 is positioned on the mandrel 30, the mandrel is placed in an autoclave (not shown). Within the autoclave the mandrel exterior is subjected to fluid pressure, typically by introduction of steam under pressure into the sealed autoclave. The steam under pressure also gives rise to a pressure gradient across the exterior hose-bearing surface 34 of the mandrel 30 and the exterior surface 44 of the sleeve 40 relative to the cavity 32 within the mandrel 30. The steam also serves to increase the temperature of the mandrel 30 and sleeve 40 and thereby soften the uncured elastomer material of the wall 42 of the sleeve. Fluid pressure forces a portion of the elastomer material of the sleeve wall 42 through the hole 33 in the mandrel 30 into the cavity 32 of the mandrel and thereby forms a hole 45 in the sleeve wall 42 which corresponds in location to hole or passageway 33 of the mandrel. The sleeve 40 having a hole 45 in its wall is thereafter cured while in position on the mandrel into a hose 10 having a hole 17 in its wall. Thereafter steam pressure within the autoclave is released, the autoclave opened and the mandrel 30 and cured hose 10 removed from the autoclave. The cured curved hose 10 is then pulled from the mandrel 30.

It may be desired to produce an elastomeric hose having a cross-sectional configuration which is not round. In this instance, a mandrel having an exterior hose-bearing surface corresponding to the desired cross-sectional configuration is used for formation of the indexing hole through the hose wall and curing of the hose. The inside perimeter of the uncured sleeve when viewed in cross-section, should closely approximate the outside perimeter of the mandrel when viewed in cross-section.

As an alternative, the interior cavity 32 of the mandrel 30 may be vented to atmospheric pressure while in the autoclave.

As a further alternative, the mandrel 30 and hose sleeve 40 may be warmed prior to curing of the sleeve 40 and a pressure differential applied to cause formation of a hole through the wall of the uncured hose in a separate operation. For example, the uncured sleeve is mounted on a warmed mandrel. The sleeve is warmed so that the elastomer material of the sleeve is in a plastic state. In a vessel thereafter, fluid pressure greater than that existing in the cavity of the mandrel is applied to the exterior surface of the sleeve and mandrel to force uncured elastomer material through the passageway in the mandrel into the cavity of the mandrel. After formation of the hole in the uncured sleeve, the mandrel and sleeve are cured in an autoclave.

When a sealed mandrel 30 like that shown in FIGS. 1 through 3 is employed, the plug 36 at the end 35 of the mandrel must periodically be removed to clean out the accumulated elastomer material from the cavity 32. Threaded plug 36 facilitates this maintenance operation.

While the invention has been described with reference to the automotive radiator hose 10 and its manufacture, the invention is not intended to be limited to such. The invention may be applied to any complexly curved hose-like article which is cured on a solid rigid mandrel in which the article is formed of curable elastomeric material.

"Curing" and related forms as used herein means setting of the elastomer material and includes vulcanization and any thermosetting or chemical setting process.

"Elastomer material" as used herein may be any of those normally used in hose manufacture, for example, natural rubber, styrene-butadiene rubber, neoprene, ethylene-propylene diene monomer rubber, ethylene-propylene copolymer rubber, butyl rubber, cis-polybutadiene, cis-polyisoprene, polyurethane, silicone rubber, and the like, as well as blends of natural and synthetic rubbers and curable blends of rubbers and resins such as vinyl resin-nitrile rubber blends.

Filamentary material used in reinforcement of the hose may be filaments or strands of rayon, nylon, polyester, polypropylene, glass, cotton, polyvinyl alcohol, etc. in the form of a braid, spiral, knit or woven construction having open areas between adjacent filaments or strands to facilitate flow of elastomer material therethrough. Preferably, in the manufacture of radiator hose, filamentary reinforcement is of a knit construction.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for use in the manufacture of cured elastomeric hose of the type which includes an indexing mark proximate an end of said hose and that is formed while the hose is mounted on a curved curing mandrel comprising:

(a) an axially elongated mandrel having an overall curved configuration corresponding to that of the hose to be cured thereon, said mandrel having a cavity therein and having an exterior hose-bearing surface for receiving said hose thereon, said mandrel further having a relatively small diametered hole in comparison to the volume of said cavity, said hole extending between said cavity and said exterior hose-bearing surface and corresponding in location to the indexing mark to be formed proximate an end of the hose when an uncured hose is sealingly mounted over said mandrel and said hole to establish a first pressure in said cavity; and (b) a pressure vessel surrounding said mandrel for providing a pressure chamber about said mandrel, means for introducing a heated fluid into said chamber of said vessel at a pressure greater than said first pressure in said cavity for causing a portion of said uncured hose overlying said hole to be forced through said hole of the mandrel into said cavity to form an indexing mark in said hose.

2. The apparatus of claim 1 wherein the cavity is in communication with atmospheric pressure when the mandrel is located in the pressure vessel.

* * * * *